March 25, 1947. H. S. BOWEN, SR., ET AL 2,417,907
ELECTRIC ARC WELDING APPARATUS
Filed Nov. 16, 1943
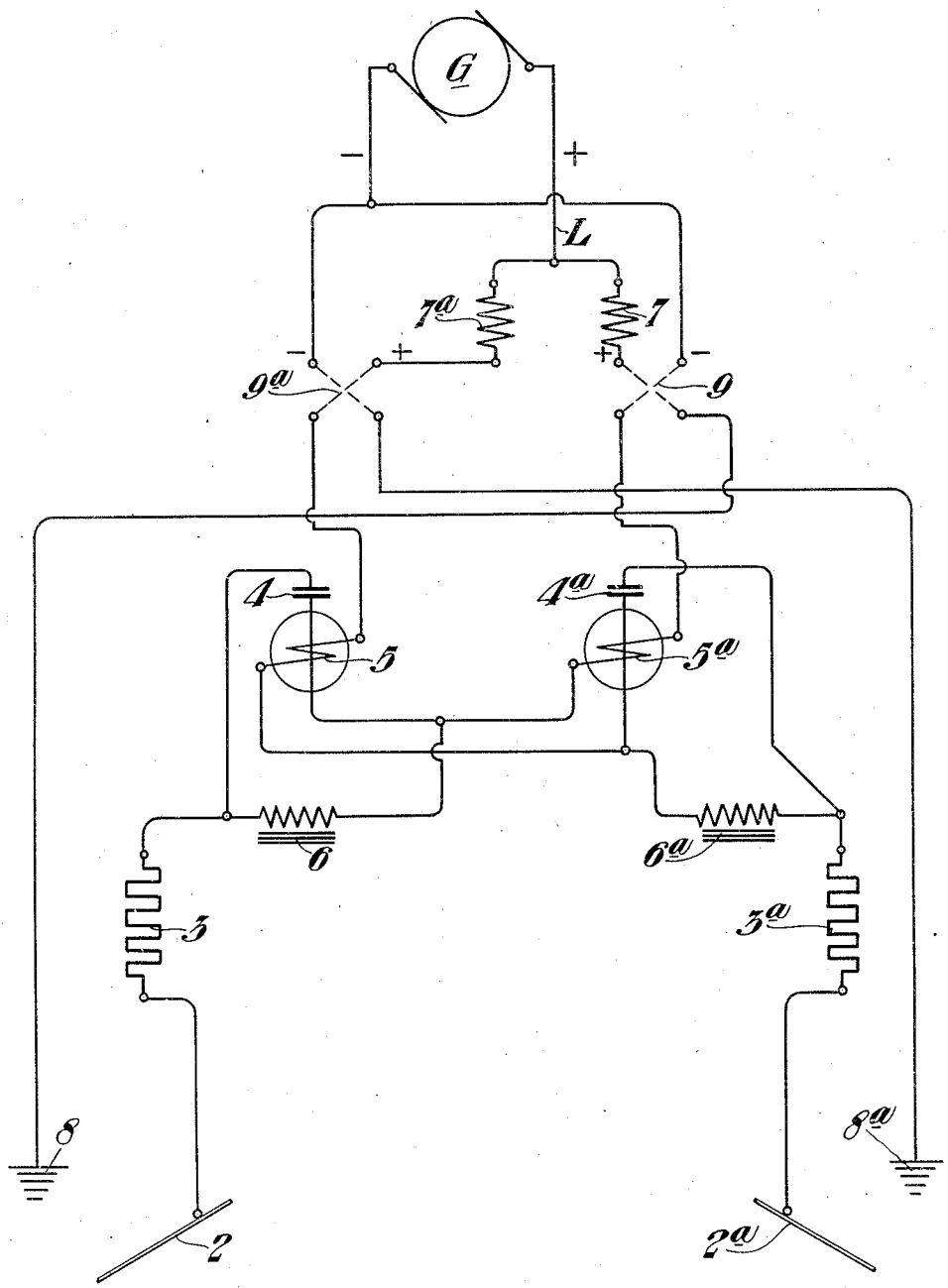
Inventors:
HUGH S. BOWEN, SR. and
JAMES A. SMITH, JR.,
by: John E. Jackson
their Attorney.

Patented Mar. 25, 1947

2,417,907

UNITED STATES PATENT OFFICE 2,417,907

ELECTRIC ARC WELDING APPARATUS

Hugh S. Bowen, Sr., Fairfield, and James A. Smith, Jr., Birmingham, Ala.

Application November 16, 1943, Serial No. 510,530

4 Claims. (Cl. 315—289)

This invention relates to welding apparatus, and particularly to improved apparatus or regulator for multiple welding by means of conventional electric arc welding apparatus.

In standard direct current welding machines, only one welding operation can be performed at any one time, i. e., only one electrode can be used. According to the present invention there is provided in such machines means whereby multiple welding can be accomplished, i. e., at least two electrodes are available for welding simultaneously. Heretofore, the only multiple electrode direct current welding units were constant potential machines which were not practical under normal operating conditions.

Accordingly, it is the general object of the present invention to provide improved apparatus or regulator for multiple welding which can be easily and conveniently incorporated with existing equipment, such as a conventional type welding machine.

It is another object of the invention to provide electric direct current arc welding apparatus having at least two electrodes whereby two welding operations can be performed simultaneously without the need of additional equipment or powering means.

It is a further object of this invention to provide multiple direct current welding apparatus or regulator which is simple and inexpensive in its construction and, at the same time, efficient and effective in its use.

Various other objects and advantages of this invention will be more apparent in the course of the following specification and will be particularly pointed out in the appended claims.

The accompanying drawing illustrates schematically an example of apparatus embodying the principles of the present invention.

The improved regulator or apparatus of our invention, as shown in this drawing, comprises two identical circuits which are arranged in parallel with each other and connected to a standard or conventional type welding generator G of a welding machine. There is arranged in each of the circuits, electrode holders 2 and 2ª, for performing welding operations simultaneously. There is arranged in each of the circuits in series with the respective electrodes 2, a resistance grid bank 3 with each preferably having manual amperage selections arranged therewith. There is also arranged in each of the circuits in series with the resistance grid 3, relay contacts 4 and 4ª and relay coils 5 and 5ª with the coil in the circuit adapted to hold normally the relay contacts of the opposed circuit in a closed position. In other words, when current is flowing in both circuits, both of the coils will be energized and the respective relays will be held in a closed position with the current passing therethrough. However, in the event one circuit is not in use and current is not flowing therein, the coil of that circuit will not be energized and, consequently, the relay of the opposed circuit will be permitted to be open.

There is arranged in shunt with the respective relay contacts 4 and 4ª of the respective circuits, choke coils 6 and 6ª which are adapted to be thrown automatically into series with its respective circuit when the opposed circuit is opened due to the relay contacts of that circuit being in an open position. In other words, the current normally flows through the relay to the resistance grid bank of each of the circuits when the relay is closed but when the relay is open the current will flow through the choke coil of the respective circuits to the resistance grid banks. It is the purpose of the choke coils 6 and 6ª to absorb the overload to which the respective circuits are subjected, when the opposed circuit is not being used. By providing such an arrangement, it will be seen that one side of the apparatus or regulator, or one electrode may be used without constant application by the opposed circuit or opposite side to the other electrode.

The lead L of the regulator or apparatus is attached to the main feeder lead of the welding generator G and the usual single ground of the generator is replaced by dual ground connections 8 and 8ª for use by the two sides of the regulator.

There is also arranged in each of the circuits, preferably balancing resistance coils 7 and 7ª so as to provide a smoother flow of current to either or both circuits thereby resulting in a smoother arc at the electrodes during the welding operations.

There is also positioned in each of the circuits, preferably polarity reversing switches 9 and 9ª whereby one side of the regulator or one electrode can operate on straight polarity and the other side or electrode on reverse polarity, according to the demands of the work being welded by either electrode.

By providing such an arrangement, it will be seen that, if desired, a plurality of regulators may be wired in bank and used with welding generators arranged in parallel. For example, three regulators could be connected to two generators and six electrodes could be operated simultaneously by such an arrangement.

As a result of our invention, it will be seen that standard or conventional type welding equipment can be made more flexible in its use. For example, a standard 400 ampere direct current welding machine used both in the shop and the field is seldom used above 200 amperes. In fact, under ordinary operating conditions, approximately 85 per cent of the time in which a welding machine is used is consumed in welding with an amperage of less than 200 amperes. Furthermore, a 400 ampere machine operating at this amperage is doing so at low load and power factors. It will be seen that by the use of equipment of the present invention, that two operators may work from the same machine at the same time employing, if necessary, different size electrodes, the only limit on the differential being the maximum amperage available to one side of the proposed apparatus.

It will be seen also that the conventional welding machine can be used as it is originally furnished, by the manufacturer merely removing the standard connections and attaching the proposed apparatus or regulator thereto. By the use of the apparatus or regulator of our invention, it will be seen that there is, in fact, provided an additional welding machine while heretofore another machine would have to be used in order to do the same amount of welding. Consequently this results in a great savings in the purchase of equipment for the reason that the proposed equipment costs approximately one-third that of a complete welding machine. Accordingly, it will be seen that the proposed equipment provides multiple welding at a relatively low cost which is a decided advantage.

While we have shown and described one specific embodiment of our invention, it will be understood that this embodiment is merely for the purpose of illustration and description and that various other forms may be devised within the scope of our invention, as defined in the appended claims.

We claim:

1. In electric welding apparatus, a source of current supply, at least two welding circuits arranged in parallel with each other and connected to said current source, an electrode arranged in each of said circuits for welding simultaneously, relay contacts in one line of each of said circuits, a choke coil in shunt with the relay contacts in each circuit, and a relay coil in series with each parallel welding circuit, each relay coil being so constructed and arranged as to close the relay contacts in one of the other parallel welding circuits when said coil is energized and to open the relay contacts when said coil is deenergized, whereby the choke coil in one circuit absorbs the overload which would otherwise be imposed on the electrode in that circuit upon breaking one of the other welding circuits.

2. In electric welding apparatus, a source of direct current supply, at least two welding circuits arranged in parallel with each other and connected to said direct current source, an electrode arranged in each of said circuits for welding simultaneously, a balancing resistance coil in each of said circuits, relay contacts in one line of each of said circuits, a choke coil in shunt with the relay contacts in each circuit, and a relay coil in series with each parallel welding circuit, each relay coil being so constructed and arranged as to close the relay contacts in one of the other parallel welding circuits when said coil is energized and to open the relay contacts when said coil is deenergized, whereby the choke coil in one circuit absorbs the overload which would otherwise be imposed on the electrode in that circuit upon breaking one of the other welding circuits.

3. In electric welding apparatus, a source of current supply, two welding circuits arranged in parallel with each other and connected to said current source, an electrode arranged in both of said circuits for welding simultaneously, relay contacts in one line of both of said circuits, a choke coil in shunt with the relay contacts in both circuits, and a relay coil in series with each parallel welding circuit, each relay coil being so constructed and arranged as to close the relay contacts in the other welding circuit when said coil is energized and to open the relay contacts when said coil is deenergized, whereby the choke coil in one circuit absorbs the overload which would otherwise be imposed on the electrode in that circuit when the other circuit is open.

4. In electric welding apparatus, a source of direct current supply, two welding circuits arranged in parallel with each other and connected to said direct current source, an electrode arranged in each of said circuits for welding simultaneously, a balancing resistance coil in each of said circuits, relay contacts in one line of each of said circuits, a choke coil in shunt with the relay contacts in each circuit, and a relay coil in series with each parallel welding circuit, each relay coil being so constructed and arranged as to close the relay contacts in the other welding circuit when said coil is energized and to open the relay contacts when said coil is deenergized, whereby the choke coil in one circuit absorbs the overload which would otherwise be imposed on the electrode in that circuit when the other circuit is open.

HUGH S. BOWEN, Sr.
JAMES A. SMITH, Jr.

REFERENCES CITED

The following references are of record in the file of this patent:

UNITED STATES PATENTS

| Number | Name | Date |
|---|---|---|
| 1,334,854 | Hadley | Mar. 23, 1920 |
| 1,416,450 | Churchward | May 16, 1922 |
| 1,621,070 | Holslag | Mar. 15, 1927 |
| 1,296,350 | Zuck | Mar. 4, 1919 |
| 1,550,721 | Henke | Aug. 25, 1925 |